(12) United States Patent
Wakimoto et al.

(10) Patent No.: US 10,177,363 B2
(45) Date of Patent: Jan. 8, 2019

(54) PRISMATIC SECONDARY BATTERY

(71) Applicant: Sanyo Electric Co., Ltd., Daito-shi, Osaka (JP)

(72) Inventors: Ryoichi Wakimoto, Hyogo (JP); Hiromasa Nishijima, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 247 days.

(21) Appl. No.: 15/062,547

(22) Filed: Mar. 7, 2016

(65) Prior Publication Data

US 2016/0293928 A1    Oct. 6, 2016

(30) Foreign Application Priority Data

Mar. 30, 2015 (JP) .................................. 2015-068194

(51) Int. Cl.
*H01M 2/02* (2006.01)
*H01M 2/22* (2006.01)
(Continued)

(52) U.S. Cl.
CPC ........... *H01M 2/263* (2013.01); *H01M 2/024* (2013.01); *H01M 2/028* (2013.01); *H01M 2/22* (2013.01);
(Continued)

(58) Field of Classification Search
CPC ...... H01M 2/263; H01M 2/024; H01M 2/028; H01M 2/22; H01M 10/0431; H01M 10/0587; H01M 10/052
(Continued)

(56) References Cited

U.S. PATENT DOCUMENTS

2009/0004561 A1    1/2009 Nansaka et al.
2012/0058389 A1*   3/2012 Guen ................... H01M 2/0237
                                                           429/179
(Continued)

FOREIGN PATENT DOCUMENTS

JP    2004047332 A  *  2/2004
JP    2009-32640 A     2/2009
(Continued)

OTHER PUBLICATIONS

Nozaki, Ko, Machine Translation of JP-2004047332-A, Feb. 2004 (Year: 2004).*

(Continued)

*Primary Examiner* — Sean P Cullen
(74) *Attorney, Agent, or Firm* — Westerman, Hattori, Daniels & Adrian, LLP (57) ABSTRACT

A prismatic secondary battery that includes a wound electrode body including a wound positive electrode core body exposed portion in one edge portion and a wound negative electrode core body exposed portion in the other edge portion. A width of the wound electrode body is 110 to 160 mm, a height thereof is 50 to 70 mm, and a thickness is 10 to 30 mm. A distance from an undersurface of a base portion of a positive electrode collector to a weld between a positive electrode connection portion and the positive electrode core body exposed portion is 10 to 25 mm, and a distance from an undersurface of a negative electrode base portion of a negative electrode collector to a weld between a negative electrode connection portion and the negative electrode core body exposed portion is 10 to 25 mm.

19 Claims, 6 Drawing Sheets

(51) Int. Cl.
*H01M 2/26* (2006.01)
*H01M 10/04* (2006.01)
*H01M 10/0587* (2010.01)
*H01M 10/052* (2010.01)

(52) U.S. Cl.
CPC ..... *H01M 10/0431* (2013.01); *H01M 10/052* (2013.01); *H01M 10/0587* (2013.01); *H01M 2220/20* (2013.01); *Y02E 60/122* (2013.01); *Y02T 10/7011* (2013.01)

(58) Field of Classification Search
USPC ....................................................... 429/161
See application file for complete search history.

(56) References Cited

U.S. PATENT DOCUMENTS

| | | | |
|---|---|---|---|
| 2012/0077065 | A1 | 3/2012 | Kamiya et al. |
| 2013/0071710 | A1* | 3/2013 | Saito ................ H01M 10/0431 |
| | | | 429/94 |
| 2014/0308555 | A1* | 10/2014 | Hattori ............. H01M 10/0431 |
| | | | 429/94 |
| 2015/0194639 | A1* | 7/2015 | Jeoung .................... H01M 2/26 |
| | | | 429/94 |
| 2015/0325832 | A1 | 11/2015 | Saito et al. |

FOREIGN PATENT DOCUMENTS

| | | | | |
|---|---|---|---|---|
| JP | 2014-086148 | A | | 5/2014 |
| JP | 2014086148 | A | * | 5/2014 |
| WO | WO-2013035668 | A1 | * | 3/2013 ........ H01M 10/0431 |
| WO | 2014/118873 | A1 | | 8/2014 |

OTHER PUBLICATIONS

Kamiya Masato, Machine Translation of JP-2014086148-A, May 2014 (Year: 2014).*

* cited by examiner

PRISMATIC SECONDARY BATTERY

CROSS REFERENCE TO RELATED APPLICATIONS

The present invention application claims priority to Japanese Patent Application No. 2015-068194 filed in the Japan Patent Office on Mar. 30, 2015, the entire contents of which are incorporated herein by reference.

BACKGROUND OF THE INVENTION

Field of the Invention

The present disclosure relates to a prismatic secondary battery.

Description of Related Art

Alkaline secondary batteries and nonaqueous electrolyte secondary batteries are used in power sources for driving electric vehicles (EV) and hybrid electric vehicles (HEV, PHEV). In such applications, since a high capacity or a high output characteristics is required, a battery pack in which a plurality of secondary batteries are connected in series or in parallel is used.

In such secondary batteries, a battery case is formed by an outer package including an opening, and a sealing plate that seals the opening. The battery case accommodates therein an electrode body including a positive electrode plate, a negative electrode plate, and a separator, together with an electrolyte. A positive electrode terminal and a negative electrode terminal are fixed to the sealing plate. The positive electrode terminal is electrically connected to the positive electrode plate through a positive electrode collector, and the negative electrode terminal is electrically connected to the negative electrode plate through a negative electrode collector.

The positive electrode plate includes a positive electrode core body made of metal, and a positive electrode active material layer formed on the surface of the positive electrode core body. A positive electrode core body exposed portion, on which no positive electrode active material layer is formed, is formed in a portion of the positive electrode core body. Furthermore, the positive electrode collector is connected to the positive electrode core body exposed portion. Furthermore, the negative electrode plate includes a negative electrode core body made of metal, and a negative electrode active material layer formed on the surface of the negative electrode core body. A negative electrode core body exposed portion, on which no negative electrode active material layer is formed, is formed in a portion of the negative electrode core body. Furthermore, the negative electrode collector is connected to the negative electrode core body exposed portion. For example, Japanese Published Unexamined Patent Application No. 2009-32640 (Patent Document 1) proposes a technique in which collectors are resistance welded to core body exposed portions.

BRIEF SUMMARY OF THE INVENTION

An on-vehicle battery for an EV, an HEV, or a PHEV is used under a condition in which vibration is continuously applied. In some cases, an extremely strong vibration or impact may be applied to the on-vehicle battery. Accordingly, a high resistance against vibration is required in an on-vehicle battery.

An aspect of a prismatic secondary battery of the present disclosure includes: a positive electrode plate in which a positive electrode active material layer is formed on a positive electrode core body; a negative electrode plate in which a negative electrode active material layer is formed on a negative electrode core body; a flat wound electrode body in which the positive electrode plate and the negative electrode plate having a separator interposed therebetween are wound; a prismatic outer package that has an opening portion and that houses the wound electrode body; a sealing plate that seals the opening portion; a positive electrode terminal that is electrically connected to the positive electrode plate and that is attached to the sealing plate; a negative electrode terminal that is electrically connected to the negative electrode plate and that is attached to the sealing plate; a positive electrode collector that electrically connects the positive electrode plate and the positive electrode terminal to each other; and a negative electrode collector that electrically connects the negative electrode plate and the negative electrode terminal to each other. In the prismatic secondary battery, the wound electrode body includes a wound positive electrode core body exposed portion in a first edge portion and a wound negative electrode core body exposed portion in a second edge portion, the wound electrode body is housed so as to be oriented inside the prismatic outer package such that a direction in which a winding axis of the wound electrode body extends is parallel to the sealing plate, the positive electrode collector includes a positive electrode base portion disposed between the sealing plate and the wound electrode body, a positive electrode lead portion that extends from an end portion of the positive electrode base portion towards a wound electrode body side, and a positive electrode connection portion that is formed on the distal end side of the positive electrode lead portion, the positive electrode connection portion is welded to an outermost surface of the wound positive electrode core body exposed portion, the negative electrode collector includes a negative electrode base portion disposed between the sealing plate and the wound electrode body, a negative electrode lead portion that extends from an end portion of the negative electrode base portion towards a wound electrode body side, and a negative electrode connection portion that is formed on the distal end side of the negative electrode lead portion, the negative electrode connection portion is welded to an outermost surface of the wound negative electrode core body exposed portion, a width W of the wound electrode body is 110 to 160 mm, a height H of the wound electrode body is 50 to 70 mm, a thickness T of the wound electrode body is 10 to 30 mm, a distance L1 from an undersurface of the positive electrode base portion to a weld between the positive electrode connection portion and the positive electrode core body exposed portion is 10 to 25 mm, and a distance L2 from an undersurface of the negative electrode base portion to a weld between the negative electrode connection portion and the negative electrode core body exposed portion is 10 to 25 mm.

While developing a prismatic secondary battery mounted in a vehicle and the like, the inventors of the present application have found that the following issues exist. In a prismatic secondary battery, a wound electrode body is connected to a sealing plate through a positive electrode collector and a negative electrode collector. Accordingly, when an extremely large vibration or impact is applied to the prismatic secondary battery, force that moves the wound electrode body in a lateral direction is applied inside the battery case, and due to the above, the positive electrode collector or the negative electrode collector may become deformed. Furthermore, when the positive electrode collector or the negative electrode collector is deformed, the positive electrode collector or the negative electrode collector may come in contact with an inner surface of the prismatic outer package. Furthermore, for example, when the prismatic outer package is electrically connected to the positive electrode plate, if the negative electrode collector comes in contact with the prismatic outer package, the positive and negative electrodes becomes short-circuited. Furthermore, in a case in which the prismatic outer package is made of aluminum or an aluminum alloy, when the negative electrode collector comes in contact with the prismatic outer package, the lithium included in the electrolyte and the prismatic outer package may become alloyed and the prismatic outer package may become corroded and damaged. Furthermore, the inventors of the present application have found that deformation of the collector occurs easily in the base portion.

As in the configuration of the prismatic secondary battery described above, by reducing the distance between the base portion of the collector and the weld between the collector and the core body exposed portion, when force moving the electrode body inside the prismatic outer package caused by vibration or impact is applied to the prismatic secondary battery, the moment applied to the base portion of the collector is reduced and deformation of the base portion of the collector can be suppressed.

Desirably, a distance X1 from an end portion of the wound electrode body on a sealing plate side to the weld between the positive electrode connection portion and the positive electrode core body exposed portion is 15 to 20 mm, and a distance Y1 from an end portion of the wound electrode body on the sealing plate side to the weld between the negative electrode connection portion and the negative electrode core body exposed portion is 15 to 20 mm.

Desirably, the prismatic outer package is a bottomed tubular prismatic outer package having a bottom portion, a distance X2 from an end portion of the wound electrode body on a sealing plate side to an end portion of the positive electrode collector on a bottom portion side is 20 to 30 mm, and a distance Y2 from an end portion of the wound electrode body on a sealing plate side to an end portion of the negative electrode collector on a bottom portion side is 20 to 30 mm.

Desirably, an insulation sheet is disposed between the negative electrode collector and the prismatic outer package.

Desirably, a thickness of the positive electrode base portion is larger than a thickness of the negative electrode base portion.

Desirably, the distance L1 from the undersurface of the positive electrode base portion to the weld between the positive electrode connection portion and the positive electrode core body exposed portion is smaller than the distance L2 from the undersurface of the negative electrode base portion to the weld between the negative electrode connection portion and the negative electrode core body exposed portion.

The present disclosure provides a prismatic secondary battery with excellent resistance against vibration.

DETAILED DESCRIPTION OF THE INVENTION

Hereinafter, a configuration of a prismatic secondary battery according to an exemplary embodiment will be described. Note that the present disclosure is not limited to the following exemplary embodiment.

Figure 1:
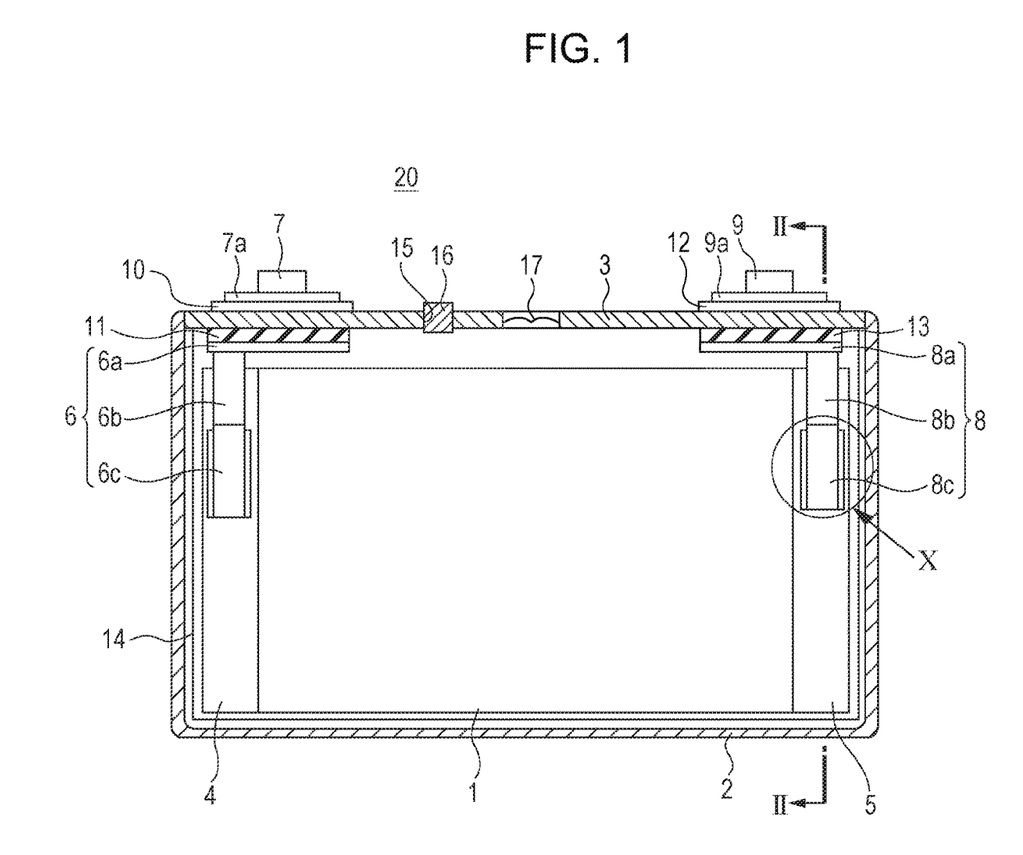
FIG. 1 is a cross section of a prismatic secondary battery according to an exemplary embodiment.

As illustrated in FIG. 1, a prismatic secondary battery 20 includes a bottomed and tubular prismatic outer package 2 that has an opening portion at the upper portion, and a sealing plate 3 that seals the opening portion. A battery case is constituted by the prismatic outer package 2 and the sealing plate 3. The prismatic outer package 2 and the sealing plate 3 are desirably made of metal and, for example, may be made of aluminum or an aluminum alloy. A flat wound electrode body 1, in which a positive electrode plate and a negative electrode plate having a separator (each not shown) interposed therebetween are wound, is accommodated inside the prismatic outer package 2 together with an electrolyte. The positive electrode plate is a member in which a positive electrode active material layer including a positive electrode active material is formed on a metal positive electrode core body. A positive electrode core body exposed portion 4 in which the positive electrode core body is exposed in the longitudinal direction of the positive electrode plate is formed in an edge portion of the positive electrode plate in the width direction. Note that an aluminum foil or an aluminum alloy foil is desirably used as the positive electrode core body. The negative electrode plate is a member in which a negative electrode active material layer including a negative electrode active material is formed on a metal negative electrode core body. A negative electrode core body exposed portion 5 in which the negative electrode core body is exposed in the longitudinal direction of the negative electrode plate is formed in an edge portion of the negative electrode plate in the width direction. Note that a copper foil or a copper alloy foil is desirably used as the negative electrode core body.

The positive electrode core body exposed portion 4 that has been wound is formed on one edge side of the wound electrode body 1 in a winding axis extending direction. By being wound, the positive electrode core body exposed portion 4 is in a layered state. A positive electrode collector 6 is connected to an outermost surface of the layered positive electrode core body exposed portion 4 in the layered direction. Furthermore, a positive electrode terminal 7 is electrically connected to the positive electrode collector 6. In the outermost surface of the layered positive electrode core body exposed portion 4 in the layered direction, a positive electrode collector receiving component is disposed on the surface on the opposite side with respect to the side on which the positive electrode collector 6 is disposed. Note that the positive electrode collector receiving component is not an essential component and can be omitted.

The negative electrode core body exposed portion 5 that has been wound is formed on the other edge side of the wound electrode body 1 in a winding axis extending direction. By being wound, the negative electrode core body exposed portion 5 is in a layered state. A negative electrode collector 8 is connected to an outermost surface of the layered negative electrode core body exposed portion 5 in the layered direction. Furthermore, a negative electrode terminal 9 is electrically connected to the negative electrode collector 8. In the outermost surface of the layered negative electrode core body exposed portion 5 in the layered direction, a negative electrode collector receiving component 30 is disposed on the surface on the opposite side with respect to the side on which the negative electrode collector 8 is disposed. The negative electrode collector receiving component 30 includes a bend portion 30a that is bent in a vertical direction from a body portion. Note that the negative electrode collector receiving component 30 is not an essential component and can be omitted.

The positive electrode terminal 7 and the positive electrode collector 6 are fixed to the sealing plate 3 through a gasket 10 and an insulating member 11, respectively. The negative electrode terminal 9 and the negative electrode collector 8 are fixed to the sealing plate 3 through a gasket 12 and an insulating member 13, respectively. Each of the gaskets 10 and 12 is disposed between the sealing plate 3 and the corresponding terminal, and each of the insulating members 11 and 13 is disposed between the sealing plate 3 and the corresponding collector. The positive electrode terminal 7 includes a flange portion 7a, and the negative electrode terminal 9 includes a flange portion 9a. The wound electrode body 1 is accommodated inside the prismatic outer package 2 while covered by an insulation sheet 14. The insulation sheet 14 covers the wound electrode body 1 and is disposed between the wound electrode body 1 and the prismatic outer package 2. The sealing plate 3 is connected by welding, such as laser welding, to an opening edge portion of the prismatic outer package 2. The sealing plate 3 includes an electrolyte injection hole 15, and the electrolyte injection hole 15 is sealed with a sealing plug 16 after injection of the liquid. A gas discharge valve 17 is formed in the sealing plate 3 to discharge gas when the pressure inside the battery becomes high.

Subsequently, a method for manufacturing the wound electrode body 1 will be described. As the positive electrode active material, a positive electrode mixture including lithium cobaltate ($LiCoO_2$), for example, is coated on both surfaces of a rectangular aluminum foil with a thickness of 15 μm which is the positive electrode core body, to form the positive electrode active material layer, and the positive electrode core body exposed portion with a predetermined width in which no positive electrode active material layer is formed is formed on an edge portion on one side of the positive electrode active material in the short-side direction such that the positive electrode plate is fabricated. Furthermore, as the negative electrode active material, a negative electrode mixture including natural graphite powder, for example, is coated on both surfaces of a rectangular copper foil with a thickness of 8 μm which is the negative electrode core body, to form the negative electrode active material layer, and the negative electrode core body exposed portion with a predetermined width in which no negative electrode active material layer is formed is formed on an edge portion on one side of the negative electrode active material in the short-side direction such that the negative electrode plate is fabricated. Note that while the material of the positive electrode active material is not particularly limited, it is desirable that the material is a lithium-transition metal composite oxide. Furthermore, while the material of the negative electrode active material is not particularly limited, it is desirable that the material is a carbon material or a silicon material.

The positive electrode core body exposed portion of the positive electrode plate and the negative electrode core body exposed portion of the negative electrode plate that have been obtained with the method described above are offset such that the active material layers of the opposing electrodes do not overlap each other, are wound while having the porous separator made of polyethylene interposed therebetween, and are pressed, such that the flat wound electrode body 1 is fabricated. In the wound electrode body 1, a portion in which an aluminum foil (the positive electrode core body exposed portion 4) is layered is formed in one of the edge portions and a portion in which a copper foil (the negative electrode core body exposed portion 5) is layered is formed in the other one of the edge portions.

A state in which the positive electrode collector 6 and the negative electrode collector 8 are attached to the sealing plate 3 will be described next.

Figure 2:
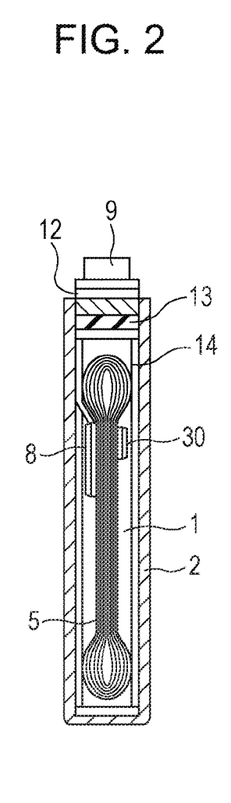
FIG. 2 is a cross section taken along II-II in FIG. 1.
Figure 3:
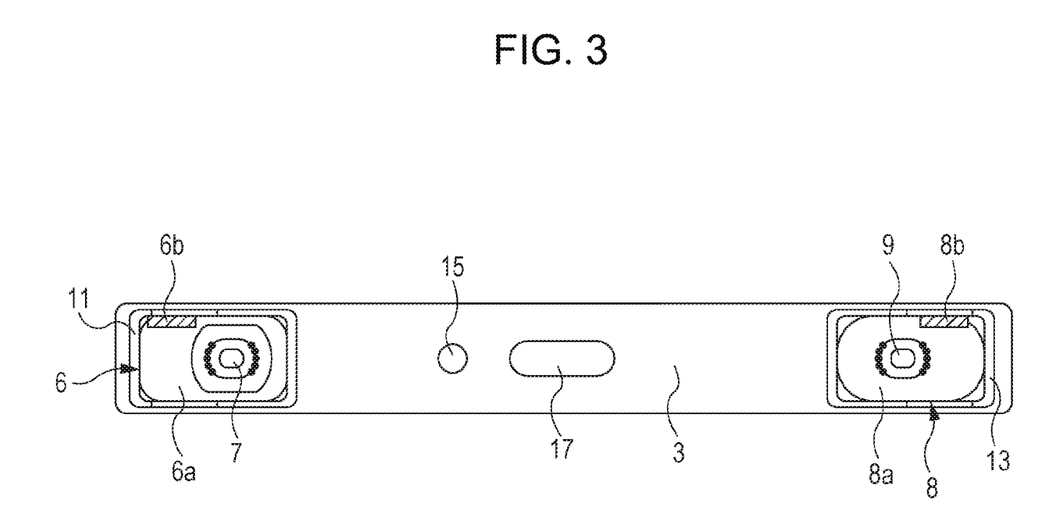
FIG. 3 is a drawing illustrating a surface on a battery inner side of a sealing plate to which a positive electrode collector and a negative electrode collector have been attached.

As illustrated in FIGS. 1 and 2, on one end side of the sealing plate 3 in the longitudinal direction, the gasket 10 is disposed on a battery outer side of the sealing plate 3 and the insulating member 11 is disposed on a battery inner side of the sealing plate 3. The positive electrode terminal 7 is disposed on the gasket 10 and the positive electrode collector 6 is disposed on the undersurface of the insulating member 11. A through hole is formed in each of the gasket 10, the sealing plate 3, the insulating member 11, and the positive electrode collector 6, and by inserting the positive electrode terminal 7 in the through holes from the battery outer side and by riveting the tip of the positive electrode terminal 7, the positive electrode terminal 7, the gasket 10, the sealing plate 3, the insulating member 11, and the positive electrode collector 6 are integrally fixed. Note that, desirably, the tip of the positive electrode terminal 7 is welded to the positive electrode collector 6.

The positive electrode collector 6 includes a base portion 6a that is disposed between the sealing plate 3 and the wound electrode body 1, a lead portion 6b that extends from an end portion of the base portion 6a towards the wound electrode body 1, and a connection portion 6c that is positioned at an distal end side of the lead portion 6b and that is connected to the positive electrode core body exposed portion 4. Note that the base portion 6a is disposed parallel to the sealing plate 3. Furthermore, the positive electrode terminal 7 is connected to the base portion 6a.

On the other end side of the sealing plate 3 in the longitudinal direction, the gasket 12 is disposed on the battery outer side of the sealing plate 3 and the insulating member 13 is disposed on the battery inner side of the sealing plate 3. Furthermore, the negative electrode terminal 9 is disposed on the gasket 12 and the negative electrode collector 8 is disposed on the undersurface of the insulating member 13. A through hole is formed in each of the gasket 12, the sealing plate 3, the insulating member 13, and the negative electrode collector 8, and by inserting the negative electrode terminal 9 in the through holes from the battery outer side and by riveting the tip of the negative electrode terminal 9, the negative electrode terminal 9, the gasket 12, the sealing plate 3, the insulating member 13, and the negative electrode collector 8 are integrally fixed. Note that, desirably, the tip of the negative electrode terminal 9 is welded to the negative electrode collector 8.

The negative electrode collector 8 includes a base portion 8a that is disposed between the sealing plate 3 and the wound electrode body 1, a lead portion 8b that extends from an end portion of the base portion 8a towards the wound electrode body 1, and a connection portion 8c that is positioned at an distal end side of the lead portion 8b and that is connected to the negative electrode core body exposed portion 5. Note that the base portion 8a is disposed parallel to the sealing plate 3. Furthermore, the negative electrode terminal 9 is connected to the base portion 8a.

The positive electrode collector 6 and the negative electrode collector 8 will be described next.

Figure 4:
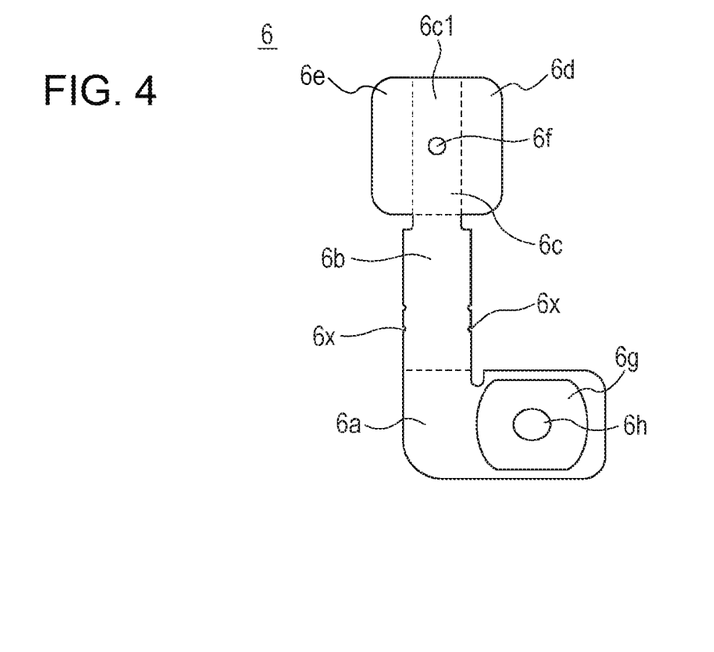
FIG. 4 is a plan view of the positive electrode collector before bending.

FIG. 4 is the positive electrode collector 6 before bending and is a plan view of a surface that faces the wound electrode body 1. The positive electrode collector 6 includes the base portion 6a, the lead portion 6b, and the connection portion 6c. The lead portion 6b is bent with respect to the base portion 6a towards the near side in the drawing. An edge portion of the connection portion 6c on one side (the right side in the figure) in the width direction bent to the far side in the drawing is a first bend portion 6d. Furthermore, an edge portion of the connection portion 6c on the other side (the left side in the figure) in the width direction bent to the far side in the drawing is a second bend portion 6e. Note that the first bend portion 6d and the second bend portion 6e can be omitted. However, it is desirable that at least the first bend portion 6d that is positioned at the edge portion of the wound electrode body 1 on the center side is provided. Furthermore, it is desirable that cutaways 6x are provided on both edges of the lead portion 6b in the width direction. A projection 6f is formed in a connection surface 6c1 of the connection portion 6c that faces the positive electrode core body exposed portion 4.

A thin wall portion 6g is formed in the base portion 6a of the positive electrode collector 6. The thin wall portion 6g is formed thinner than the other portions of the base portion 6a. Furthermore, a through hole 6h is formed in the thin wall portion 6g. Accordingly, the tip of the positive electrode terminal 7 is inserted into the through hole 6h and is riveted and fixed to the thin wall portion 6g. Note that it is desirable that the positive electrode collector 6 is made of aluminum or an aluminum alloy.

Figure 5:
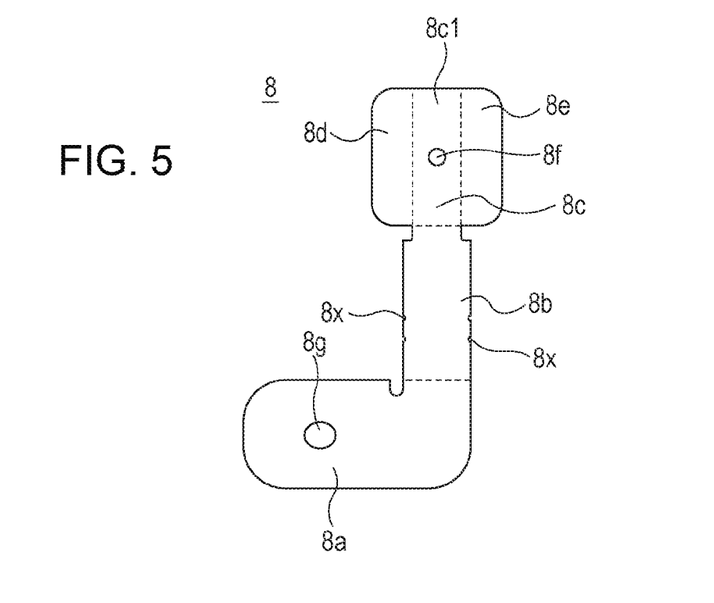
FIG. 5 is a plan view of the negative electrode collector before bending.

FIG. 5 is the negative electrode collector 8 before bending and is a plan view of a surface that faces the wound electrode body 1. The negative electrode collector 8 includes the base portion 8a, the lead portion 8b, and the connection portion 8c. The lead portion 8b is bent with respect to the base portion 8a towards the near side in the drawing. An edge portion of the connection portion 8c on one side (the left side in the figure) in the width direction bent to the far side in the drawing is a first bend portion 8d. Furthermore, an edge portion of the connection portion 8c on the other side (the right side in the figure) in the width direction bent to the far side in the drawing is a second bend portion 8e. Note that the first bend portion 8d and the second bend portion 8e can be omitted. However, it is desirable that at least the first bend portion 8d that is positioned at the edge portion of the wound electrode body 1 on the center side is provided. Furthermore, it is desirable that cutaways 8x are provided on both edges of the lead portion 8b in the width direction. A projection 8f is formed in a connection surface 8c1 of the connection portion 8c that faces the negative electrode core body exposed portion 5.

A through hole 8g is formed in the base portion 8a of the negative electrode collector 8. Accordingly, the tip of the negative electrode terminal 9 is inserted into the through hole 8g and is riveted and fixed to the base portion 8a. Note that the negative electrode collector 8 is desirably made of copper or a copper alloy. Furthermore, the surface of the negative electrode collector 8 may be plated with Ni or the like.

The positive electrode collector 6 and the negative electrode collector 8 may be bent before being fixed to the sealing plate 3 or the bending may be performed after being fixed to the sealing plate 3. For example, before fixing the collector (6, 8) to the sealing plate 3, the first bend portion (6d, 8d) and the second bend portion (6e, 8e) may be bent with respect to the connection portion (6c, 8c), and after fixing the collector (6, 8) to the sealing plate 3, the lead portion (6b, 8b) may be bent with respect to the base portion (6a, 8a). Furthermore, before fixing the collector (6, 8) to the sealing plate 3, the lead portion (6b, 8b) may be bent with respect to the base portion (6a, 8a). Furthermore, after fixing the collector (6, 8) to the sealing plate 3, the first bend portion (6d, 8d) and the second bend portion (6e, 8e) may be bent with respect to the connection portion (6c, 8c).

A method of attaching the positive electrode collector 6 and the negative electrode collector 8 to the wound electrode body 1 will be described next.

Note that attaching the positive electrode collector 6 to the wound electrode body 1 and attaching the negative electrode collector 8 to the wound electrode body 1 can be performed with practically the same method; accordingly, the attaching method will be described hereinafter with the negative electrode side as an example.

The negative electrode collector 8 is disposed on the outermost surface of the wound negative electrode core body exposed portion 5. Furthermore, the negative electrode collector receiving component 30 is disposed on the surface on the opposite side with respect to the side of the wound negative electrode core body exposed portion 5 on which the negative electrode collector 8 is disposed. Furthermore, one of the electrodes for resistance welding is abutted against the outer surface of the negative electrode collector 8 and the other one of the electrodes for resistance welding is abutted against the outer surface of the negative electrode collector receiving component 30. Furthermore, in a state in which the electrodes for resistance welding hold the negative electrode collector 8, the negative electrode core body exposed portion 5, and the negative electrode collector receiving component 30 therebetween, a resistance welding current is applied to resistance weld the negative electrode collector 8, the negative electrode core body exposed portion 5, and the negative electrode collector receiving component 30. Note that the negative electrode collector receiving component 30 is not an essential component and the negative electrode collector receiving component 30 can be omitted.

Note that it is desirable that an insulation film is disposed between the negative electrode collector 8 around the welded connection between the negative electrode collector 8 and the negative electrode core body exposed portion 5, and the negative electrode core body exposed portion 5. Furthermore, it is desirable that an insulation film is disposed between the negative electrode collector receiving component 30 around the welded connection between the negative electrode collector receiving component 30 and the negative electrode core body exposed portion 5, and the negative electrode core body exposed portion 5.

Figure 6:
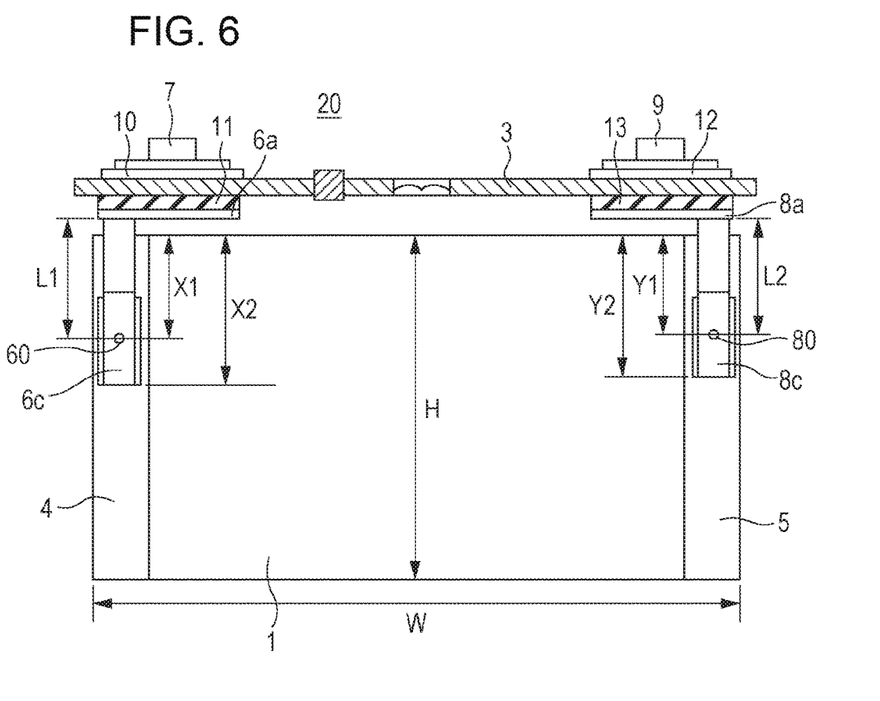
FIG. 6 is a front view of the electrode body to which collectors have been attached.
Figure 7:
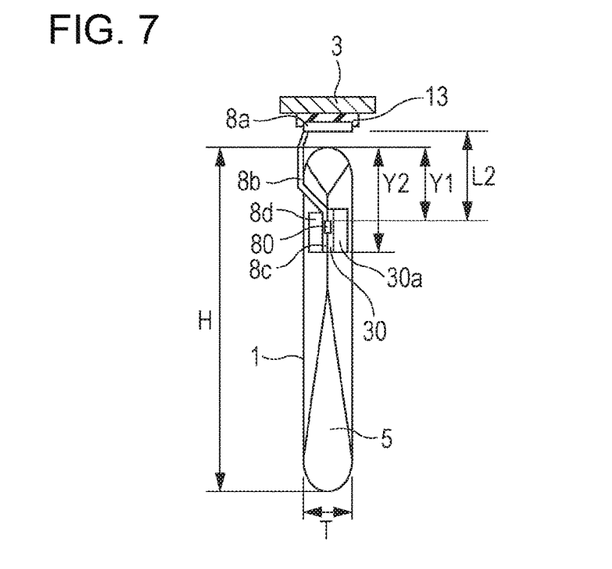
FIG. 7 is a side view of the electrode body to which the collector has been attached.

FIG. 6 is a front view of the wound electrode body 1 to which the positive electrode collector 6 and the negative electrode collector 8 have been attached. FIG. 7 is a side view of the negative electrode core body exposed portion 5 side of the wound electrode body 1 to which the positive electrode collector 6 and the negative electrode collector 8 have been attached. Note that in FIG. 7, the second bend portion 8e is omitted.

As illustrated in FIG. 6, a weld nugget 60 is formed in the weld between the positive electrode collector 6 and the positive electrode core body exposed portion 4. Furthermore, a weld nugget 80 is formed in the weld between the negative electrode collector 8 and the negative electrode core body exposed portion 5. In FIG. 6, the weld nugget 60 and the weld nugget 80 are illustrated while the positive electrode collector 6 and the negative electrode collector 8 are seen through. Actually, the weld nugget 60 is not formed on the surface on the outer side of the positive electrode collector 6. Furthermore, the weld nugget 80 is not formed on the surface on the outer side of the negative electrode collector 8. Furthermore, a depression that is a pressing mark of the electrode for resistance welding is formed in each of the outer surfaces of the positive electrode collector 6 and the negative electrode collector 8.

Assembly of Secondary Battery

Disposed in the insulation sheet 14, the wound electrode body 1 connected to the positive electrode collector 6 and the negative electrode collector 8 is inserted into the prismatic outer package 2. Subsequently, the connection between the sealing plate 3 and the prismatic outer package 2 is welded together by laser welding and the opening portion of the prismatic outer package 2 is sealed. Subsequently, the prismatic secondary battery 20 is fabricated by injecting a nonaqueous electrolyte through the electrolyte injection hole 15 provided in the sealing plate 3 and by sealing the electrolyte injection hole 15 with the sealing plug 16.

Herein, issues of a prismatic secondary battery according to a reference example will be described.

Figure 8A:
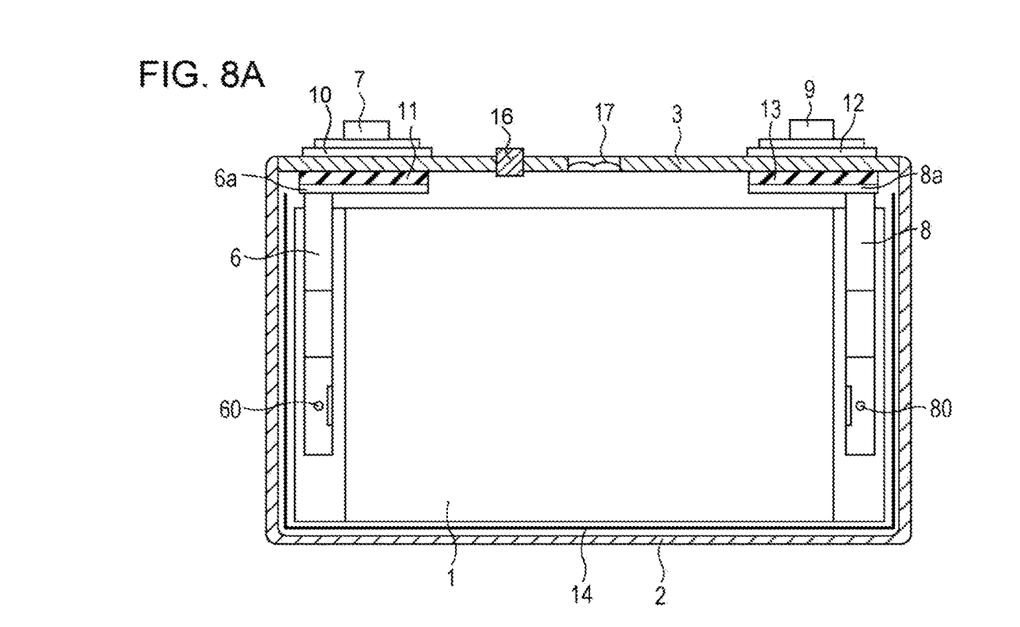
FIGS. 8A and 8B are each cross sections of a prismatic secondary battery according to a reference example.
Figure 8B:
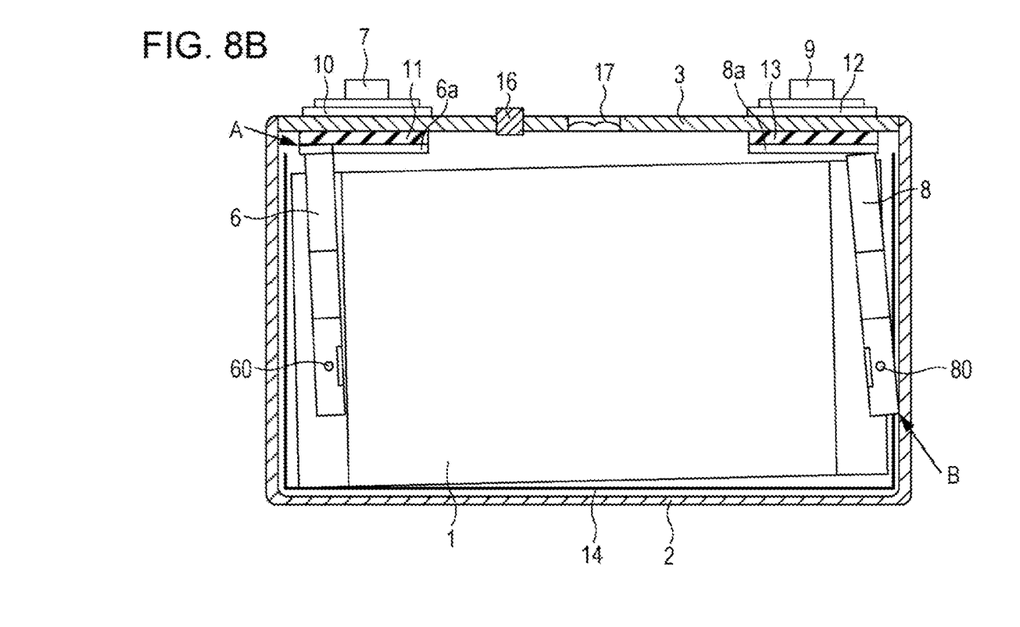

FIGS. 8A and 8B are each a cross section of the prismatic secondary battery according to the reference example. When manufacturing a prismatic secondary battery using a flat wound electrode body, in order to connect a collector to a wound core body exposed portion by welding, the wound core body exposed portion needs to be in a bundled state. In the wound core body exposed portion, there are areas in which the core body exposed portion is layered in a bent state at the two ends of the flat wound electrode body in the height direction. Accordingly, in the wound core body exposed portion, it is relatively difficult to bundle the core body exposed portion at the two end sides of the flat wound electrode body in the height direction. Conversely, in the middle portion of the flat wound electrode body in the height direction, the core body exposed portion can be bundled easily. Accordingly, as illustrated in FIGS. 8A and 8B, when the width of the wound electrode body is large and the height of the wound electrode body is low, the collector and the core body exposed portion have been connected at substantially the middle of the wound electrode body in the height direction where it is most easy to bundle the core body exposed portion.

However, while developing the prismatic secondary battery, the inventors of the present application have found that the following issue exists in the prismatic secondary battery illustrated in FIGS. 8A and 8B. In a case in which the distance between the base portion (6a, 8a) and the weld nugget (60, 80) of the collector is large, when force moving the wound electrode body 1 in a lateral direction is applied by an extremely strong vibration or impact, the collector (6, 8) may be deformed and the wound electrode body 1 may move inside the prismatic outer package 2. Furthermore, an edge portion of the lower end of the collector (6, 8) may tear through the insulation sheet 14 and come in contact with the inner surface of the prismatic outer package 2.

Specifically, as illustrated in FIG. 8B, the base portion 6a of the positive electrode collector 6 is deformed so as to be bent (the portion indicated by "A"). Subsequently, an edge portion of the lower end of the negative electrode collector 8 tears through the insulation sheet 14 and comes in contact with the inner surface of the prismatic outer package 2 (the portion indicated by "B").

Figure 9:
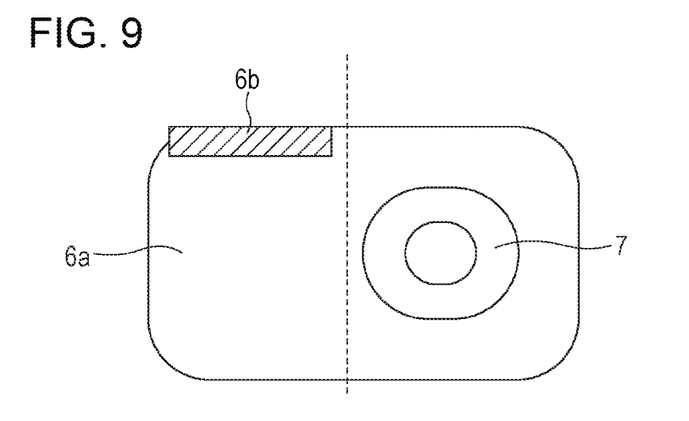
FIG. 9 is a plan view of a base portion of the positive electrode collector.

FIG. 9 is a plan view of the base portion 6a of the positive electrode collector 6. The base portion 6a is easily deformed so as to be bent in the dotted line portion. The above is because the position where the positive electrode terminal 7 is connected to the base portion 6a and the position where the lead portion 6b is provided in the base portion 6a are offset with respect each other in the longitudinal direction of the sealing plate 3.

Size and Distances of Wound Electrode Body in Prismatic Secondary Battery 20 According to Exemplary Embodiment As illustrated in FIG. 6, in the prismatic secondary battery 20, a width (a width extending in the direction in which the winding axis extends) W of the wound electrode body 1 is 110 to 160 mm, a height (a height extending in the direction orthogonal to the direction in which the winding axis extends and in the direction orthogonal to the thickness direction of the wound electrode body 1) H of the wound electrode body 1 is 50 to 70 mm, and, as illustrated in FIG. 7, a thickness T of the wound electrode body 1 is 10 to 30 mm. As above, the wound electrode body 1 used in the prismatic secondary battery 20 is characterized in that the height H is lower and the width W and the thickness T are greater compared to those of conventional wound electrode bodies.

Furthermore, in the prismatic secondary battery 20, a distance L1 from the undersurface of the base portion 6a of the positive electrode collector 6 to the weld (the end portion of the weld nugget 60 on the sealing plate 3 side) is 10 to 25 mm, and a distance L2 from the undersurface of the base portion 8a of the negative electrode collector 8 to the weld (the end portion of the weld nugget 80 on the sealing plate 3 side) is 10 to 25 mm. Accordingly, even if force moving the wound electrode body 1 in the lateral direction is applied by a strong vibration or impact, the moment applied to the base portion (6a, 8a) can be reduced. Accordingly, deformation of the positive electrode collector 6 or the negative electrode collector 8 is suppressed.

Furthermore, in the prismatic secondary battery 20, a distance X1 from the upper end portion (an end portion on the sealing plate 3 side) of the wound electrode body 1 to the weld (the end portion of the weld nugget 60 on the sealing plate 3 side) on the positive electrode side is 15 to 20 mm, and a distance Y1 from the upper end portion of the wound electrode body 1 to the weld (the end portion of the weld nugget 80 on the sealing plate 3 side) on the negative electrode side is 15 to 20 mm. Furthermore, a distance X2 from the upper end portion of the wound electrode body 1 to the lower end portion (the end portion on the bottom portion side of the prismatic outer package 2) of the positive electrode collector 6 is 20 to 30 mm, and a distance Y2 from the upper end portion of the wound electrode body 1 to the lower end portion (the end portion on the bottom portion side of the prismatic outer package 2) of the negative electrode collector 8 is 20 to 30 mm.

With such a configuration, even if an extremely strong vibration or impact is applied to the prismatic secondary battery and the collector is deformed, the core body exposed portion comes into contact with the prismatic outer package 2 through the insulation sheet 14 before the collector. The thickness of the core body exposed portion is smaller than that of the collector. Furthermore, at the lower end of the wound core body exposed portion, the core body exposed portion is layered with gaps therebetween. Accordingly, the core body exposed portion that is softer than the collector serves as a cushion and the collector can be reliably prevented from tearing through the insulation sheet 14 and from coming in direct contact with the inner surface of the prismatic outer package.

Note that in the prismatic secondary battery 20, the thickness T of the wound electrode body 1 is large, that is, the thickness T of the wound electrode body 1 is 10 to 30 mm. Accordingly, since the wound core body exposed portion has a moderate rigidity and elasticity, it is easy for the core body exposed portion to function as a cushion. Accordingly, even if the wound electrode body 1 moves inside the prismatic outer package 2, the wound core body exposed portion functions as a cushion material and, the collector can be reliably prevented from tearing through the insulation sheet 14 and coming in contact with the inner surface of the prismatic outer package 2. Note that, more preferably, the thickness T of the wound electrode body 1 is 15 to 30 mm.

The inventors of the present application have found that the base portion 6a of the positive electrode collector 6 made of aluminum or an aluminum alloy is bent more easily than the base portion 8a of the negative electrode collector 8 made of copper or a copper alloy when a strong impact or vibration is applied to the prismatic secondary battery. Accordingly, in the prismatic secondary battery 20, the thickness of the base portion 6a of the positive electrode collector 6 is larger than the thickness of the base portion 8a of the negative electrode collector 8. With the above, both the positive electrode collector 6 and the negative electrode collector 8 are not easily deformed. Note that the thickness of the base portion 6a of the positive electrode collector 6 is, preferably, 0.5 to 2.0 mm, and more preferably, 1.0 to 1.8 mm. The thickness of the base portion 8a of the negative electrode collector 8 is, preferably, 0.5 to 2.0 mm, and more preferably, 0.8 to 1.5 mm.

[Battery 1]

As the wound electrode body 1, a flat wound electrode body having a width of W=145 mm, a height H=60 mm, and a thickness of T=20 mm is used. Furthermore, L1=23 mm, L2=23 mm, X1=20 mm, Y1=20 mm, X2=25 mm, Y2=25 mm. Then, the prismatic secondary battery is fabricated with the method described above.

[Battery 2]

As the wound electrode body 1, a flat wound electrode body having a width of W=140 mm, a height H=55 mm, and a thickness of T=20 mm is used. Furthermore, L1=22 mm, L2=22 mm, X1=15 mm, Y1=15 mm, X2=20 mm, Y2=20 mm. Then, the prismatic secondary battery is fabricated with the method described above.

[Battery 3]

As the wound electrode body 1, a flat wound electrode body having a width of W=120 mm, a height H=55 mm, and a thickness of T=10 mm is used. Furthermore, L1=24 mm, L2=24 mm, X1=18 mm, Y1=18 mm, X2=25 mm, Y2=25 mm. Then, the prismatic secondary battery is fabricated with the method described above.

[Battery 4]

As the wound electrode body 1, a flat wound electrode body having a width of W=130 mm, a height H=55 mm, and a thickness of T=10 mm is used. Furthermore, L1=24 mm, L2=24 mm, X1=18 mm, Y1=18 mm, X2=25 mm, Y2=25 mm. Then, the prismatic secondary battery is fabricated with the method described above.

[Battery 5]

As the wound electrode body 1, a flat wound electrode body having a width of W=150 mm, a height H=60 mm, and a thickness of T=10 mm is used. Furthermore, L1=20 mm, L2=20 mm, X1=15 mm, Y1=18 mm, X2=20 mm, Y2=20 mm. Then, the prismatic secondary battery is fabricated with the method described above.

In the batteries 1 to 5, even if a strong impact or vibration is applied to the prismatic secondary battery, the deformation of the collectors is suppressed.

[Others]

Figure 10:
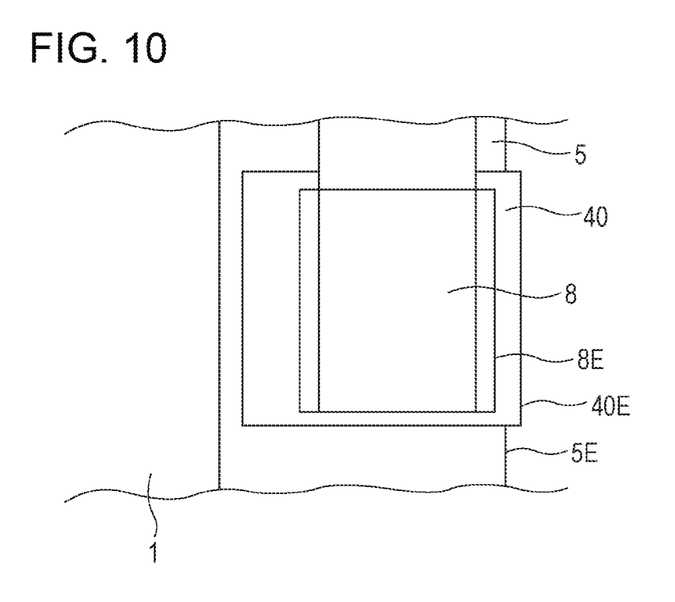
FIG. 10 is an enlarged view of a portion X in FIG. 1.

As illustrated in FIG. 10, desirably, an insulator film 40 is disposed between the negative electrode collector 8 (the positive electrode collector 6) and the negative electrode core body exposed portion 5 (the positive electrode core body exposed portion 4). Furthermore, desirably, in the direction in which the winding axis of the wound electrode body 1 extends, an edge portion 40E of the insulator film 40 on the tip side of the negative electrode core body exposed portion 5 (the positive electrode core body exposed portion 4) protrudes to the prismatic outer package 2 side with respect to an edge portion 5E of the negative electrode core body exposed portion 5 (the positive electrode core body exposed portion 4), and the edge portion 40E of the insulator film 40 on the tip side of the negative electrode core body exposed portion 5 (the positive electrode core body exposed portion 4) protrudes to the prismatic outer package 2 side with respect to an edge portion 8E of the negative electrode collector 8 (the positive electrode collector 6) on the tip side of the negative electrode core body exposed portion 5 (positive electrode core body exposed portion 4). Such a configuration can further reliably prevent the edge portion (the lower right edge in FIG. 10) at the lower end of the negative electrode collector 8 (the positive electrode collector 6) from tearing through the insulation sheet 14 and coming in direct contact with the inner surface of the prismatic outer package 2.

Note that as the insulator film, a heat welding film, a tape material in which an adhesive layer is formed on a base material, or the like may be used.

The welding method of the positive electrode collector and the positive electrode core body exposed portion, and the welding method of the negative electrode collector and the negative electrode core body exposed portion are not limited to any method in particular. Resistance welding, ultrasonic welding, welding using a high-energy ray such as a laser, or the like may be used.

In the exemplary embodiment described above, an example has been illustrated that connects the terminal and the collector by inserting the terminal in the through hole of the collector and by riveting the tip of the terminal on the collector. The method of connecting the terminal and the collector is not limited to the above, and the terminal and the collector may be connected by welding or the terminal and the collector may be an integral component.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:
1. A prismatic secondary battery, comprising:
a positive electrode plate in which a positive electrode active material layer is formed on a positive electrode core body;
a negative electrode plate in which a negative electrode active material layer is formed on a negative electrode core body;
a flat wound electrode body in which the positive electrode plate and the negative electrode plate having a separator interposed therebetween are wound;
a prismatic outer package that has an opening portion and that houses the wound electrode body;
a sealing plate that seals the opening portion;
a positive electrode terminal that is electrically connected to the positive electrode plate and that is attached to the sealing plate;
a negative electrode terminal that is electrically connected to the negative electrode plate and that is attached to the sealing plate;
a positive electrode collector that electrically connects the positive electrode plate and the positive electrode terminal to each other; and
a negative electrode collector that electrically connects the negative electrode plate and the negative electrode terminal to each other;
wherein the wound electrode body includes a wound positive electrode core body exposed portion in a first edge portion and a wound negative electrode core body exposed portion in a second edge portion,
wherein the wound electrode body is housed so as to be oriented inside the prismatic outer package such that a winding axis extending direction of the wound electrode body is parallel to the sealing plate,
wherein the positive electrode collector includes a positive electrode base portion disposed between the sealing plate and the wound electrode body, a positive electrode lead portion that extends from an end portion of the positive electrode base portion towards a wound electrode body side, and a positive electrode connection portion that is formed on a distal end side of the positive electrode lead portion,
wherein the positive electrode connection portion is welded to an outermost surface of the wound positive electrode core body exposed portion,
wherein the negative electrode collector includes a negative electrode base portion disposed between the sealing plate and the wound electrode body, a negative electrode lead portion that extends from an end portion of the negative electrode base portion towards the wound electrode body side, and a negative electrode connection portion that is formed on a distal end side of the negative electrode lead portion,
wherein the negative electrode connection portion is welded to an outermost surface of the wound negative electrode core body exposed portion,
wherein a width W of the wound electrode body is 110 to 160 mm,
wherein a height H of the wound electrode body is 50 to 70 mm,
wherein a thickness T of the wound electrode body is 10 to 30 mm,
wherein a distance L1 from an undersurface of the positive electrode base portion to a sealing-plate-side edge of a weld between the positive electrode connection portion and the wound positive electrode core body exposed portion is 10 to 25 mm, and
wherein a distance L2 from an undersurface of the negative electrode base portion to a sealing-plate-side edge of a weld between the negative electrode connection portion and the wound negative electrode core body exposed portion is 10 to 25 mm,
wherein a minimum distance between the wound positive electrode core body exposed portion and the prismatic outer package is shorter than a minimum distance between the positive electrode collector and the prismatic outer package, in the winding axis extending direction, and
wherein a minimum distance between the wound negative electrode core body exposed portion and the prismatic outer package is shorter than a minimum distance between the negative electrode collector and the prismatic outer package, in the winding axis extending direction.

2. The prismatic secondary battery according to claim 1, wherein a minimum distance between the prismatic outer package and the weld between the positive electrode connection portion and the wound positive electrode core body exposed portion is longer than the minimum distance between the positive electrode collector and the prismatic outer package, in the winding axis extending direction, and
wherein a minimum distance between the prismatic outer package and the weld between the negative electrode connection portion and the wound negative electrode core body exposed portion is longer than the minimum distance between the negative electrode collector and the prismatic outer package, in the winding axis extending direction.

3. The prismatic secondary battery according to claim 1, wherein an insulation film is disposed between the negative electrode collector and the wound negative electrode core body exposed portion,
wherein a minimum distance between the insulation film and the prismatic outer package is shorter than the minimum distance between the wound negative electrode core body exposed portion and the prismatic outer package, in the winding axis extending direction, and
wherein an insulation sheet is disposed between the negative electrode collector and the prismatic outer package.

4. The prismatic secondary battery according to claim 1, wherein a first insulating member is disposed between the sealing plate and the positive electrode base portion, so as to electrically insulate the sealing plate from the positive electrode base portion via the first insulating member, and
wherein a second insulating member is disposed between the sealing plate and the negative electrode base portion, so as to electrically insulate the sealing plate from the negative electrode base portion via the second insulating member.

5. The prismatic secondary battery according to claim 4, wherein the positive electrode base portion comprises a plate extending substantially parallel to the sealing plate, and
wherein the negative electrode base portion comprises a plate extending substantially parallel to the sealing plate.

6. The prismatic secondary battery according to claim 5, wherein the sealing plate includes a first through hole and a second through hole,
wherein the positive electrode terminal passes through the first through hole, wherein the negative electrode terminal passes through the second through hole, wherein the positive electrode base portion includes a third through hole, wherein the negative electrode base portion includes a fourth through hole, wherein a portion of the positive electrode terminal is located within the third through hole, and wherein a portion of the negative electrode terminal is located within the fourth through hole.

7. A prismatic secondary battery, comprising:

a positive electrode plate in which a positive electrode active material layer is formed on a positive electrode core body;

a negative electrode plate in which a negative electrode active material layer is formed on a negative electrode core body;

a flat wound electrode body in which the positive electrode plate and the negative electrode plate having a separator interposed therebetween are wound;

a prismatic outer package that has an opening portion and that houses the wound electrode body;

a sealing plate that seals the opening portion;

a positive electrode terminal that is electrically connected to the positive electrode plate and that is attached to the sealing plate;

a negative electrode terminal that is electrically connected to the negative electrode plate and that is attached to the sealing plate;

a positive electrode collector that electrically connects the positive electrode plate and the positive electrode terminal to each other; and a negative electrode collector that electrically connects the negative electrode plate and the negative electrode terminal to each other;

wherein the wound electrode body includes a wound positive electrode core body exposed portion in a first edge portion and a wound negative electrode core body exposed portion in a second edge portion, wherein the wound electrode body is housed so as to be oriented inside the prismatic outer package such that a winding axis extending direction of the wound electrode body is parallel to the sealing plate, wherein the positive electrode collector includes a positive electrode base portion disposed between the sealing plate and the wound electrode body, a positive electrode lead portion that extends from an end portion of the positive electrode base portion towards a wound electrode body side, and a positive electrode connection portion that is formed on a distal end side of the positive electrode lead portion, wherein the positive electrode connection portion is welded to an outermost surface of the wound positive electrode core body exposed portion, wherein the negative electrode collector includes a negative electrode base portion disposed between the sealing plate and the wound electrode body, a negative electrode lead portion that extends from an end portion of the negative electrode base portion towards the wound electrode body side, and a negative electrode connection portion that is formed on a distal end side of the negative electrode lead portion, wherein the negative electrode connection portion is welded to an outermost surface of the wound negative electrode core body exposed portion, wherein a width W of the wound electrode body is 110 to 160 mm, wherein a height H of the wound electrode body is 50 to 70 mm, wherein a thickness T of the wound electrode body is 10 to 30 mm, wherein a distance L1 from an undersurface of the positive electrode base portion to a sealing-plate-side edge of a weld between the positive electrode connection portion and the wound positive electrode core body exposed portion is 10 to 25 mm, wherein a distance L2 from an undersurface of the negative electrode base portion to a sealing-plate-side edge of a weld between the negative electrode connection portion and the wound negative electrode core body exposed portion is 10 to 25 mm, wherein a first insulating member is disposed between the sealing plate and the positive electrode base portion, so as to electrically insulate the sealing plate from the positive electrode base portion via the first insulating member, wherein a second insulating member is disposed between the sealing plate and the negative electrode base portion, so as to electrically insulate the sealing plate from the negative electrode base portion via the second insulating member, wherein a thickness of the positive electrode base portion is larger than a thickness of the negative electrode base portion, and wherein the distance L1 from the undersurface of the positive electrode base portion to the sealing-plate-side edge of the weld between the positive electrode connection portion and the wound positive electrode core body exposed portion is smaller than the distance L2 from the undersurface of the negative electrode base portion to the sealing-plate-side edge of the weld between the negative electrode connection portion and the wound negative electrode core body exposed portion.

8. The prismatic secondary battery according to claim 7, wherein a minimum distance between the wound positive electrode core body exposed portion and the prismatic outer package is shorter than a minimum distance between the positive electrode collector and the prismatic outer package, in the winding axis extending direction, wherein a minimum distance between the wound negative electrode core body exposed portion and the prismatic outer package is shorter than a minimum distance between the negative electrode collector and the prismatic outer package, in the winding axis extending direction, wherein a minimum distance between the prismatic outer package and the weld between the positive electrode connection portion and the wound positive electrode core body exposed portion is longer than the minimum distance between the positive electrode collector and the prismatic outer package, in the winding axis extending direction, wherein a minimum distance between the prismatic outer package and the weld between the negative electrode connection portion and the wound negative electrode core body exposed portion is longer than the minimum distance between the negative electrode collector and the prismatic outer package, in the winding axis extending direction.

9. The prismatic secondary battery according to claim 7, wherein the sealing plate includes a first through hole and a second through hole, wherein the positive electrode terminal passes through the first through hole, wherein the negative electrode terminal passes through the second through hole, wherein the first through hole is positioned inside a perimeter of the sealing plate and apart from the prismatic outer package, and wherein the second through hole is positioned inside the perimeter of the sealing plate and apart from the prismatic outer package.

10. The prismatic secondary battery according to claim 9, wherein the positive electrode base portion includes a third through hole, wherein the negative electrode base portion includes a fourth through hole, wherein a portion of the positive electrode terminal is located within the third through hole, and wherein a portion of the negative electrode terminal is located within the fourth through hole.

11. The prismatic secondary battery according to claim 10, wherein the positive electrode base portion includes a thin wall portion that is thinner than surrounding portions of the positive electrode base portion, and wherein the third through hole is disposed at the thin wall portion.

12. The prismatic secondary battery according to claim 11, wherein the thin wall portion comprises a surface of the positive electrode base portion which faces the flat wound electrode body.

13. A prismatic secondary battery, comprising:

a positive electrode plate in which a positive electrode active material layer is formed on a positive electrode core body;

a negative electrode plate in which a negative electrode active material layer is formed on a negative electrode core body;

a flat wound electrode body in which the positive electrode plate and the negative electrode plate having a separator interposed therebetween are wound;

a prismatic outer package that has an opening portion and that houses the wound electrode body;

a sealing plate that seals the opening portion;

a positive electrode terminal that is electrically connected to the positive electrode plate and that is attached to the sealing plate;

a negative electrode terminal that is electrically connected to the negative electrode plate and that is attached to the sealing plate;

a positive electrode collector that electrically connects the positive electrode plate and the positive electrode terminal to each other; and a negative electrode collector that electrically connects the negative electrode plate and the negative electrode terminal to each other;

wherein the wound electrode body includes a wound positive electrode core body exposed portion in a first edge portion and a wound negative electrode core body exposed portion in a second edge portion, wherein the wound electrode body is housed so as to be oriented inside the prismatic outer package such that a winding axis extending direction of the wound electrode body is parallel to the sealing plate, wherein the positive electrode collector includes a positive electrode base portion disposed between the sealing plate and the wound electrode body, a positive electrode lead portion that extends from an end portion of the positive electrode base portion towards a wound electrode body side, and a positive electrode connection portion that is formed on a distal end side of the positive electrode lead portion, wherein the positive electrode connection portion is welded to an outermost surface of the wound positive electrode core body exposed portion, wherein the negative electrode collector includes a negative electrode base portion disposed between the sealing plate and the wound electrode body, a negative electrode lead portion that extends from an end portion of the negative electrode base portion towards the wound electrode body side, and a negative electrode connection portion that is formed on a distal end side of the negative electrode lead portion, wherein the negative electrode connection portion is welded to an outermost surface of the wound negative electrode core body exposed portion, wherein a width W of the wound electrode body is 110 to 160 mm, wherein a height H of the wound electrode body is 50 to 70 mm, wherein a thickness T of the wound electrode body is 10 to 30 mm, wherein a distance L1 from an undersurface of the positive electrode base portion to a sealing-plate-side edge of a weld between the positive electrode connection portion and the wound positive electrode core body exposed portion is 10 to 25 mm, and wherein a distance L2 from an undersurface of the negative electrode base portion to a sealing-plate-side edge of a weld between the negative electrode connection portion and the wound negative electrode core body exposed portion is 10 to 25 mm, wherein a distance X1 from an end portion of the wound electrode body on a sealing plate side to the sealing-plate-side edge of the weld between the positive electrode connection portion and the wound positive electrode core body exposed portion is 15 to 20 mm, wherein a distance Y1 from the end portion of the wound electrode body on the sealing plate side to the sealing-plate-side edge of the weld between the negative electrode connection portion and the wound negative electrode core body exposed portion is 15 to 20 mm, wherein the prismatic outer package is a bottomed tubular prismatic outer package having a bottom portion, wherein a distance X2 from an end portion of the wound electrode body on the sealing plate side to an end portion of the positive electrode collector on a bottom portion side is 20 to 30 mm, wherein a distance Y2 from the end portion of the wound electrode body on the sealing plate side to an end portion of the negative electrode collector on the bottom portion side is 20 to 30 mm.

14. The prismatic secondary battery according to claim 13, wherein a thickness of the positive electrode base portion is larger than a thickness of the negative electrode base portion.

15. The prismatic secondary battery according to claim 13, wherein an insulation sheet is disposed between the negative electrode collector and the prismatic outer package.

16. The prismatic secondary battery according to claim 13, wherein the distance L1 from the undersurface of the positive electrode base portion to the sealing-plate-side edge of the weld between the positive electrode connection portion and the wound positive electrode core body exposed portion is smaller than the distance L2 from the undersurface of the negative electrode base portion to the sealing-plate-side edge of the weld between the negative electrode connection portion and the wound negative electrode core body exposed portion.

17. The prismatic secondary battery according to claim 13,
wherein a first insulating member is disposed between the sealing plate and the positive electrode base portion, so as to electrically insulate the sealing plate from the positive electrode base portion via the first insulating member, and
wherein a second insulating member is disposed between the sealing plate and the negative electrode base portion, so as to electrically insulate the sealing plate from the negative electrode base portion via the second insulating member.

18. The prismatic secondary battery according to claim 13,
wherein the sealing plate includes a first through hole and a second through hole,
wherein the positive electrode terminal passes through the first through hole,
wherein the negative electrode terminal passes through the second through hole,
wherein the positive electrode base portion includes a third through hole,
wherein the negative electrode base portion includes a fourth through hole,
wherein a portion of the positive electrode terminal is located within the third through hole, and
wherein a portion of the negative electrode terminal is located within the fourth through hole.

19. The prismatic secondary battery according to claim 13,
wherein a minimum distance between the wound positive electrode core body exposed portion and the prismatic outer package is shorter than a minimum distance between the positive electrode collector and the prismatic outer package, in the winding axis extending direction,
wherein a minimum distance between the wound negative electrode core body exposed portion and the prismatic outer package is shorter than a minimum distance between the negative electrode collector and the prismatic outer package, in the winding axis extending direction,
wherein a minimum distance between the prismatic outer package and the weld between the positive electrode connection portion and the wound positive electrode core body exposed portion is longer than the minimum distance between the positive electrode collector and the prismatic outer package, in the winding axis extending direction, and
wherein a minimum distance between the prismatic outer package and the weld between the negative electrode connection portion and the wound negative electrode core body exposed portion is longer than the minimum distance between the negative electrode collector and the prismatic outer package, in the winding axis extending direction.

* * * * *